United States Patent [19]

Masuda et al.

[11] Patent Number: 4,654,272

[45] Date of Patent: Mar. 31, 1987

[54] DECREASING THE FRICTIONAL SOUNDS OF NON-OLEFINIC SYNTHETIC RESIN MATERIALS

[75] Inventors: Masamichi Masuda, Tokyo; Shinichi Sawai, Kunitachi; Naoto Ishii, Asaka, all of Japan

[73] Assignees: Honda Giken Kogyo Kabushiki Kaisha, Tokyo; Tokyo Seat Kabushiki Kaisha, Asaka, both of Japan

[21] Appl. No.: 686,869

[22] Filed: Dec. 27, 1984

[30] Foreign Application Priority Data

Dec. 28, 1983 [JP] Japan .................... 58-247356

[51] Int. Cl.$^4$ .............. B32B 27/08; B05D 3/02; B28B 9/00; C08J 5/14

[52] U.S. Cl. .................. 428/474.4; 428/476.9; 428/483; 428/522; 428/543; 427/11; 427/401; 427/385.5; 427/407.1; 524/230; 523/153; 264/241

[58] Field of Search ........... 428/593, 483, 522, 476.9, 428/474.4; 427/11, 401, 385.5, 407.1; 264/241

[56] References Cited

U.S. PATENT DOCUMENTS

| | | | |
|---|---|---|---|
| 3,936,560 | 2/1976 | Santurri et al. | 428/483 |
| 4,350,739 | 9/1982 | Mohiuddin | 428/543 |
| 4,456,650 | 6/1984 | Melotik et al. | 428/543 |

Primary Examiner—P. C. Ives
Attorney, Agent, or Firm—Armstrong, Nikaido, Marmelstein & Kubovcik

[57] ABSTRACT

Frictional sounds caused by molded articles, particularly molded parts for automobiles, of non-olefinic synthetic resins rubbing against one another are decreased by incorporating an amide stearate or derivative thereof in the molded article or by coating the surface of the molded article with the stearate.

12 Claims, No Drawings

DECREASING THE FRICTIONAL SOUNDS OF NON-OLEFINIC SYNTHETIC RESIN MATERIALS

FIELD OF THE INVENTION

This invention relates to frictional sound-lowering agents to control frictional sounds produced when molded articles, particularly interior parts for automobiles, consisting of non-olefinic series resins such as PVC and ABS are contacted with each other.

DESCRIPTION OF THE PRIOR ART

Non-olefinic series resins such as PVC and ABS which have good appearance and nice touch when molded are frequently used for the interior parts of automobiles. Parts are sometimes molded from olefinic-series resins but these resins cannot provide the wettish touch that is provided by non-olefinic series resins because of their waxlike or eraserlike surface state.

However, when parts molded from non-olefinic series resins are placed in contact with each other, frictional squeaky sounds are produced which can make driving uncomfortable. It is believed that these frictional sounds result from a "Stick-Slip" phenomenon wherein the sounds are caused by each resin material being extended by friction and then contracting by separation of the ultimate extension. In other words, although the frictional resistance values between the parts depend on conditions of the parts such as temperature, pressure, hardness, velocity, material quality, and surface structure, the frictional resistance can produce irritating sounds when there is a large difference between the coefficient of static friction and that of kinematic friction.

In order to decrease these frictional sounds, various methods have been disclosed including placing a slip tape, e.g., Teflon tape, on the surface of the parts as described in Japanese Laid-Open Patent Publication No. 47-12614 published Oct. 14, 1972, the placing of buffer materials such as urethane slabs and unwoven cloth between the parts, and the applying of a lubricant, e.g., silicone, on the surface of the parts. However, the slip tape and buffer materials are not suitable because they not only require much labor and time for application thereof but they cannot be applied to parts having complicated surface structures and may worsen the appearance. The lubricants are sticky and easily removed from the surface by friction.

An object of this invention is to provide frictional sound-lowering agents for resin materials used for molded parts for automobiles and, more particularly, agents which decrease the production of frictional sounds by decreasing the difference between the coefficient of static friction and that of kinematic friction in parts molded from non-olefinic series resins.

SUMMARY OF THE INVENTION

According to the present invention, an amide stearate or a derivative thereof is combined with non-olefinic series synthetic resins such as PVC and ABS in molded parts for automobiles, or a paint containing an amide stearate or a derivative thereof is applied to the surface of a part molded from a non-olefinic series resin material to decrease the difference between the coefficient of static friction and the coefficient of kinematic friction obtained when the molded parts are contacted with each other.

DESCRIPTION OF PREFERRED EMBODIMENTS

The interior parts for cars which are molded from synthetic resins according to the present invention include sheetlike parts such as inner panel surface leather, door surface leather, roof surface leather, garnish, change lever boots, and sun visors; and rim components such as opening trim, quarter trim, FR roof trim, and rear roof trim. These parts are typically formed from non-olefinic series resins such as PVC (polyvinylchloride) and ABS (acrylonitrile-butadiene-styrene copolymer).

The non-olefinic series resins can be molded into interior parts for cars after a frictional sound-lowering agent containing an amide stearate and/or a derivative thereof as an effective component is kneaded therein.

In addition to the frictional sound-lowering agent, various conventional components of molded parts for automobiles including plasticizer, stabilizers, fillers and other additives, can be combined with the non-olefinic series resin. These materials are used in conventional amounts as will be understood by persons of ordinary skill in the art. Sample formulations for molded parts for automobiles are shown in Table 1.

The amide stearate or derivative thereof is used in an amount of at least 0.7 part per 100 parts by weight of the non-olefinic synthetic resin. When the frictional sound-lowering agent is used in an amount of less than 0.7 part per 100 parts of the resin, heat bleeding initially lowers frictional sounds but there is a problem as to durability. On the other hand, an excessive amount of the frictional sound-lowering agent bleeds excessively and gives the molded article an appearance of being powdered on the surface. Therefore, the amount of the agent combined with the synthetic resin should be more than 0.7 part but less than about 10 parts per 100 parts resin.

TABLE 1

| Component (parts by weight) | | Example 1 | Example 2 |
|---|---|---|---|
| Resin | PVC (molecular weight 1100) | 100 | |
| Plasticizer | DIDP | 50-75 | |
| | Epoxidated soy bean oil | 2-3 | |
| Stabilizer | Stearate Ba/Zn | 0.7-0.9 | |
| | Diphenyl octyl phosphite | slightly | |
| Additives | $Sb_2O_3$ | 1-3 | |
| Filler | $CaCO_3$ | 20-25 | |
| Frictional sound-lowering agent | Bisamide stearate | 0.7 or more | Ethylene bis-amide hydroxy-stearate 0.7 or more |

In another embodiment according to the present invention, the frictional sound-lowering agent may be applied to the surface of an interior part for an automobile that has been molded from a non-olefinic series resin in the form of a coating or paint. As the coating or paint, there can be used any material which provides a vehicle for applying the amide stearate or derivative to the surface of the molded article and which will not deleteriously affect the appearance of the surface. For example, coatings such as those described in Table 2 can be used.

These coatings are applied to the surface of interior parts for cars with a spray coater or a bar coater.

To determine the effect of using an amide stearate according to the present invention as a frictional sound-lowering agent, molded parts for cars produced by combining the frictional sound-lowering agents with the non-olefinic synthetic resin or by coating parts molded from a non-olefinic synthetic resin with a coating containing the agents were rubbed against each other. The frictional sound produced by rubbing the parts together was measured with a noise-measuring instrument A range at a distance of 10 cm away from the parts. The results are shown in Tables 3 and 4. It is to be noted that the background noise level obtained before measuring the frictional sounds, namely in the blank test, was 50–51 dB.

TABLE 2

| Component | Example 1 | | Example 2 | Example 3 | Example 4 | Example 5 | Example 6 |
|---|---|---|---|---|---|---|---|
| Resin | PVC series | 5 wt % | ← | Acrylic resins | ← | Acrylic polyester copolymer | ← |
| Delustering Agent | Silica | 1.0 wt % | ← | ← | ← | ← | ← |
| | PE | 1.5 wt % | | | | | |
| Stabilizer | Modified epoxy | 3.0 wt % | ← | ← | ← | ← | ← |
| | Chelator | 0.5 wt % | | | | | |
| | Stearate Ba/Zn | 1.0 wt % | | | | | |
| | Organic tin maleate | 2.0 wt % | | | | | |
| Solvent | Toluene | 82 wt % | | | | | |
| | MEK | 82 wt % | | | | | |
| | Cyclohexane | 82 wt % | ← | ← | ← | ← | ← |
| Frictional sound-lowering agent | Ethylene bisamide hydroxystearate | 2–4 wt % | Bisamide stearate 2–4 wt % | Ethylene bisamide hydroxystearate 2–4 wt % | Bisamide stearate 2–4 wt % | Ethylene bisamide hydroxystearate 2–4 wt % | Bisamide stearate 2–4 wt % |

TABLE 3

Frictional Sound-Lowering Agent (Bisamide Stearate) Combined with the Synthetic Resin

| | Soft PVC | ABS | Soft PVC + 0.7% | Soft PVC + 1.0% | Soft PVC + 2.0% |
|---|---|---|---|---|---|
| Soft PVC | 80 dB | 82 | 52 | 52 | 52 |
| Soft PVC + 0.7%* | 53 | 54 | 53 | — | — |
| Soft PVC + 1.0% | 52 | 54 | — | 52 | — |
| Soft PVC +2.0% | 52 | 51 | — | — | 53 |

*The amount of the frictional sound-lowering agent is based on the weight of the synthetic resin.

TABLE 4

Molded Article Coated with the Frictional Sound-Lowering Agent (Bisamide Stearate)

| | Soft PVC | ABS | Soft PVC + 2.0% | Soft PVC + 4.0% |
|---|---|---|---|---|
| Soft PVC | 80 dB | 82 | 52 | 52 |
| Soft PVC + 2.0% | 53 | 51 | 52 | 52 |
| Soft PVC + 4.0% | 52 | 51 | 52 | 52 |

As clearly shown in Tables 3 and 4, it has been found that an amide stearate and/or a derivative thereof can decrease the production of the frictional sounds caused when molded articles are rubbed against one another. The frictional sound-lowering agents of this invention can effectively decrease the frictional sounds without any problems relating to stickiness and durability such as that caused when a lubricant is used and without the difficulties of inserting slip tapes, urethane slabs and unwoven cloths in complicated surface structures.

We claim:

1. In an interior part for an automobile wherein said part is a molded article of a non-olefinic synthetic resin, the improvement wherein an amide stearate is combined with said synthetic resin in said molded article in an amount of 0.7 to 10 parts by weight per 100 parts by weight of resin.

2. In an interior part for an automobile wherein said part is a molded article of a non-olefinic synthetic resin, the improvement wherein said molded article is coated with an amide stearate in an amount sufficient to decrease frictional sounds caused when two such molded articles rub against one another.

3. The interior part for an automobile of claim 1 or 2, wherein said non-olefinic synthetic resin is a polyvinyl chloride resin or an acrylonitrile-butadiene-styrene resin.

4. The interior part for an automobile of claim 1 or 2, wherein said amide stearate is bisamide stearate or ethylene bisamide hydroxystearate.

5. A molded article comprising a non-olefinic synthetic resin and 0.7 to 10 parts by weight per 100 parts by weight of said resin of an amide stearate.

6. A molded article comprising a non-olefinic synthetic resin and, on a surface thereof, a coating of an amide stearate.

7. The molded article of claim 5 or 6 wherein said non-olefinic synthetic resin is a polyvinyl chloride resin or an acrylonitrile-butadiene-styrene resin.

8. A molded article of claim 5 or 6 wherein said amide stearate is bisamide stearate or ethylene bisamide hydroxystearate.

9. A method for decreasing the frictional sounds caused by the rubbing of the surfaces of molded parts of non-olefinic synthetic resins against one another comprising molding at least one of said molded parts from a non-olefinic synthetic resin containing 0.7 to 10 parts by weight of an amide stearate per 100 parts by weight of the resin.

10. A method for decreasing the frictional sounds caused by the rubbing of surfaces of molded parts of non-olefinic synthetic resins against one another comprising coating at least one of said surfaces with an amide stearate in an amount sufficient to decrease the difference between the coefficient of static friction and the coefficient of kinematic friction obtained when the molded parts are contacted with each other.

11. The method of claim 9 or 10, wherein said non-olefinic synthetic resin is a polyvinyl chloride resin or an acrylonitrile-butadiene-styrene resin.

12. The method of claim 9 or 10 wherein, said amide stearate is bisamide stearate or ethylene bisamide hydroxystearate.

* * * * *